United States Patent
Nakajima

(10) Patent No.: US 8,065,837 B2
(45) Date of Patent: Nov. 29, 2011

(54) AUTOMOTIVE DOOR

(75) Inventor: Yasunori Nakajima, Yokohama (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 158 days.

(21) Appl. No.: 11/878,059

(22) Filed: Jul. 20, 2007

(65) Prior Publication Data

US 2008/0141592 A1 Jun. 19, 2008

(30) Foreign Application Priority Data

Dec. 15, 2006 (JP) ................................. 2006-337763

(51) Int. Cl.
*B60J 5/04* (2006.01)

(52) U.S. Cl. .......................................... 49/502; 49/352

(58) Field of Classification Search .................... 49/502; 296/146.5, 146.6, 146.7
See application file for complete search history.

(56) References Cited

U.S. PATENT DOCUMENTS

| | | | |
|---|---|---|---|
| 4,937,977 A | | 7/1990 | Gergoe et al. |
| 5,040,335 A | * | 8/1991 | Grimes ........................... 49/502 |
| 5,762,394 A | * | 6/1998 | Salmonowicz et al. .... 296/146.5 |
| 5,906,072 A | | 5/1999 | Feige et al. |
| 5,927,020 A | * | 7/1999 | Kobrehel .......................... 49/502 |
| 6,029,403 A | * | 2/2000 | Bertolini et al. ................. 49/502 |
| 6,139,088 A | | 10/2000 | Okamoto et al. |
| 6,170,199 B1 | * | 1/2001 | Stenzel et al. ................... 49/502 |
| 6,449,907 B2 | * | 9/2002 | Nishikawa et al. .............. 49/502 |
| 6,616,216 B2 | * | 9/2003 | Furuyama et al. .......... 296/146.7 |
| 6,698,140 B2 | | 3/2004 | Tatsumi et al. |
| 6,725,606 B2 | * | 4/2004 | Nishikawa et al. .............. 49/502 |
| 6,817,804 B2 | * | 11/2004 | Le Gallo et al. ............ 403/408.1 |
| 6,857,688 B2 | * | 2/2005 | Morrison et al. .......... 296/146.7 |
| 2002/0066232 A1 | * | 6/2002 | Tatsumi et al. .................. 49/502 |
| 2004/0074149 A1 | * | 4/2004 | Tatsumi et al. .................. 49/352 |
| 2007/0101658 A1 | | 5/2007 | Heyer |
| 2007/0119102 A1 | | 5/2007 | Seibert |

FOREIGN PATENT DOCUMENTS

| | | |
|---|---|---|
| DE | 3608506 A1 * | 11/1987 |
| DE | 196 50 531 A1 | 6/1997 |
| DE | 197 32 225 B4 | 2/1999 |
| DE | 199 44 965 A1 | 3/2001 |
| DE | 20 2005 017 526 U1 | 12/2005 |
| DE | 20 2005 018 470 U1 | 2/2006 |
| DE | 20 2005 014 607 U1 | 2/2007 |
| EP | 0 967 097 A1 | 12/1999 |
| FR | 2 802 237 A1 | 6/2001 |
| JP | 2002-166726 | 6/2002 |
| WO | WO 02/075090 A1 | 9/2002 |

OTHER PUBLICATIONS

The automotive door of the motor vehicle, type Mazda 2—development code: J 37, http://de.wikipedia.org/wiki/Mazda2, Apr. 3, 2003, 5 pages.

* cited by examiner

*Primary Examiner* — Jerry Redman

(74) *Attorney, Agent, or Firm* — Foley & Lardner LLP

(57) ABSTRACT

An automotive door comprises an outer metal panel and an inner metal panel which are coupled with each other to constitute a door base construction. The door base construction has therein a clearance that is defined between the outer and inner metal panels. A module base is incorporated with the inner metal panel and has a swelled portion that is projected into the clearance. Due to provision of module base having such swelled portion, rigidity of the door is increased.

25 Claims, 8 Drawing Sheets

AUTOMOTIVE DOOR

BACKGROUND OF THE INVENTION

1. Field of the Invention

The present invention relates in general to automotive doors and more particularly to the automotive doors of a type that exhibits excellent rigidity and durability against an external force applied thereto. More specifically, the present invention relates to the automotive doors of a type that has an inside grip handle and exhibits excellent rigidity and durability against an external force applied thereto from the inside grip handle.

2. Description of the Related Art

Hitherto, in the field of motor vehicles, various doors have been proposed and put into practical use. Most of them are of a type that comprises an outer metal panel, an inner metal panel of which peripheral edges are welded to those of the outer metal panel, and a door trim that is lined on an inner surface of the inner metal panel. Between the outer and inner metal panels, there is formed a certain clearance for installing therein various elements for a power window mechanism.

Hitherto, assembling the elements of the power window mechanism in the clearance has been carried out by handwork of an operator. For this, the inner metal panel is formed with a handhole through which one hand of the operator inserts into the clearance for assembling the elements.

Recently, a new assembling technique has been proposed in which the elements are assembled beforehand on a module base that is separate from the inner metal panel formed with a larger opening, and then the module base is secured to the inner metal panel having the assembled elements on the module base projected into the clearance through the larger opening.

Usually, an automotive door is provided at its inside surface with a grip handle that is to be gripped and handled by a passenger when he or she intends to open and close the door.

When the grip handle is pulled by the passenger for closing the door, a certain stress is applied to a handle mounting portion where the grip handle is connected to the door. Thus, if the grip handle is strongly pulled, a larger stress is applied to the handle mounting portion, which of course tends to induce an undesirable deformation of the handle mounting portion of the door, particularly, a deformation of the inner metal panel to which the grip handle is directly connected.

For suppressing such undesired deformation, it may be thought out that the thickness of the handle mounting portion is increased and/or the handle mounting portion is reinforced by a reinforcing plate. However, such measures tend to induce increase in cost and weight of the door.

Actually, various measures for solving the above-mentioned deformation of the handle mounting portion of the door have been proposed, some of which are disclosed in Japanese Laid-open Patent Application (Tokkai) 2002-166726, U.S. Pat. No. 4,937,977 and WO2002/075090. However, even the measures disclosed by such publications have failed to provide the handle mounting portion of a door with satisfactory rigidity and durability for some reason.

SUMMARY OF THE INVENTION

It is therefore an object of the present invention to provide an automotive door, which is free of the above-mentioned drawbacks.

According to the present invention, there is provided an automotive door that includes a robustly constructed module base that is incorporated with an inner metal panel of the door, the module base having a satisfied rigidity in not only a vertical direction but also a horizontal direction.

In accordance with a first aspect of the present invention, there is provided an automotive door which comprises an outer metal panel; an inner metal panel that is coupled with the outer metal panel to constitute a base construction of the door, the base construction having therein a clearance between the outer and inner metal panels; and a module base incorporated with the inner metal panel and having a swelled portion that is projected into the clearance.

In accordance with a second aspect of the present invention, there is provided an automotive door which comprises an outer metal panel; an inner metal panel that is coupled with the outer metal panel to constitute a door base construction, the door base construction having therein a clearance between the outer and inner metal panels, the inner metal panel having a handhole; a module base including a swelled portion, the module base being secured to the inner metal panel in a manner to cover the handhole by the swelled portion, the swelled portion being projected into the clearance of the door base construction; a first boss portion integral with a depressed back surface of the swelled portion and projected in a direction away from the swelled portion; and a grip handle having a second boss portion secured to the first boss portion and a third boss portion secured to a given part of the inner metal panel.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

In the following, an automotive door of the present invention will be described in detail with reference to the accompanying drawings.

For ease of understanding, various directional terms such as right, left, upper, lower, rightward and the like are used in the following description. However, such terms are to be understood with respect to only a drawing or drawings on which a corresponding part or portion is shown.

Figure 1:
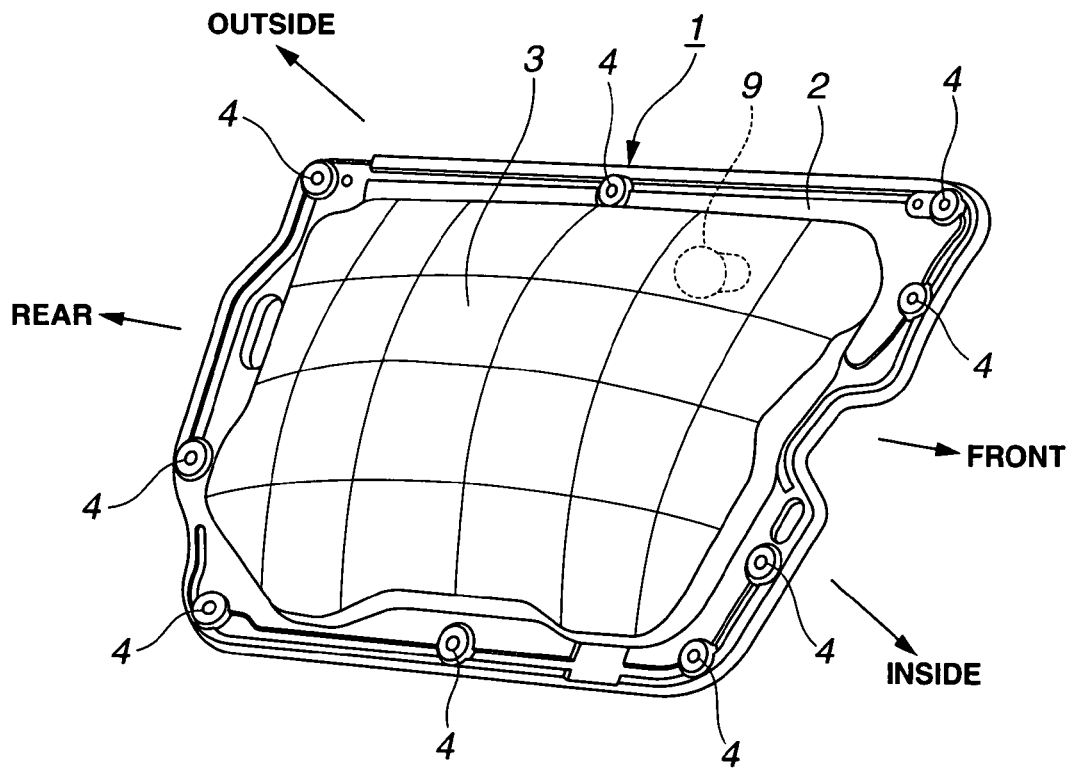
FIG. 1 is a schematically illustrated module base that is an essential element of an automotive door of the present invention.

Referring to FIG. 1, there is shown in a perspective fashion a module base 1 employed in an automotive door of the present invention.

It is to be noted that the module base 1 illustrated in FIG. 1 is a schematic view and thus some portions and parts which are actually formed or provided thereon are not shown in the drawing.

The module base 1 is constructed of an integrally molded ABS resin pregnant with glass fibers as a reinforcing material.

Figure 6:
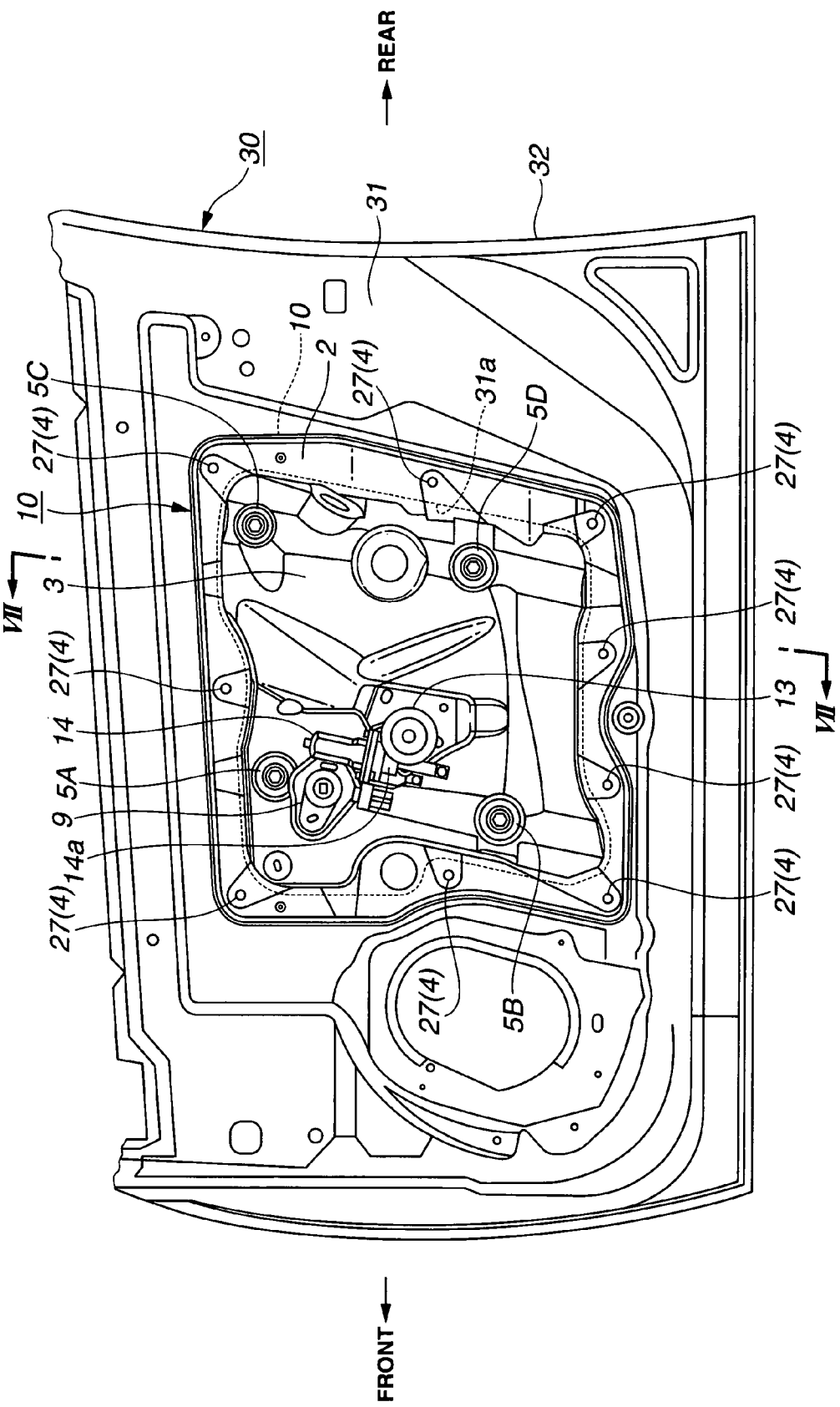
FIG. 6 is a view of the module base mounted in a door base construction, that is taken from an inside of the vehicle.
Figure 7:
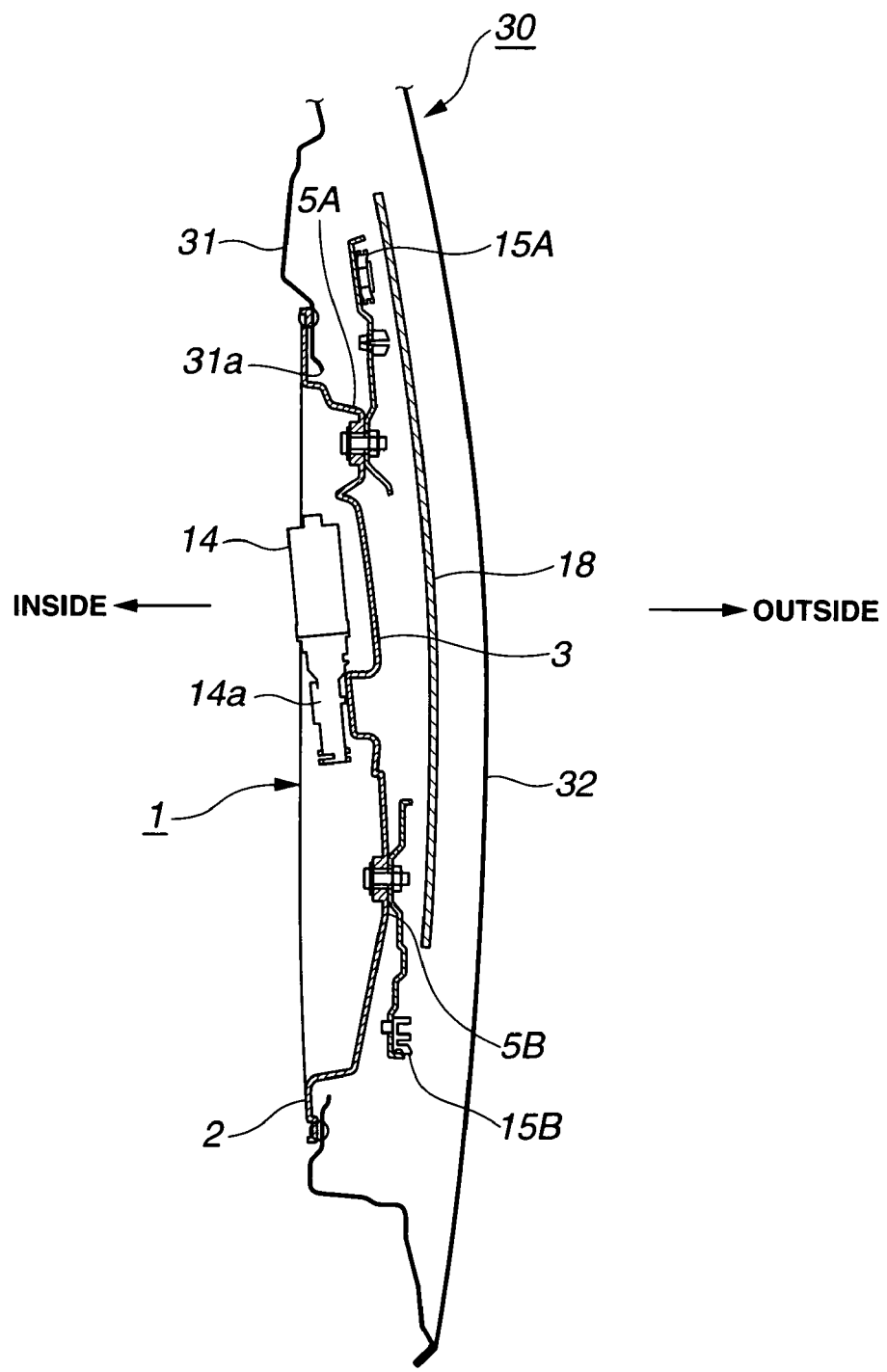
FIG. 7 is a schematically illustrated sectional view taken along the line "VII-VII" of FIG. 6.
Figure 8:
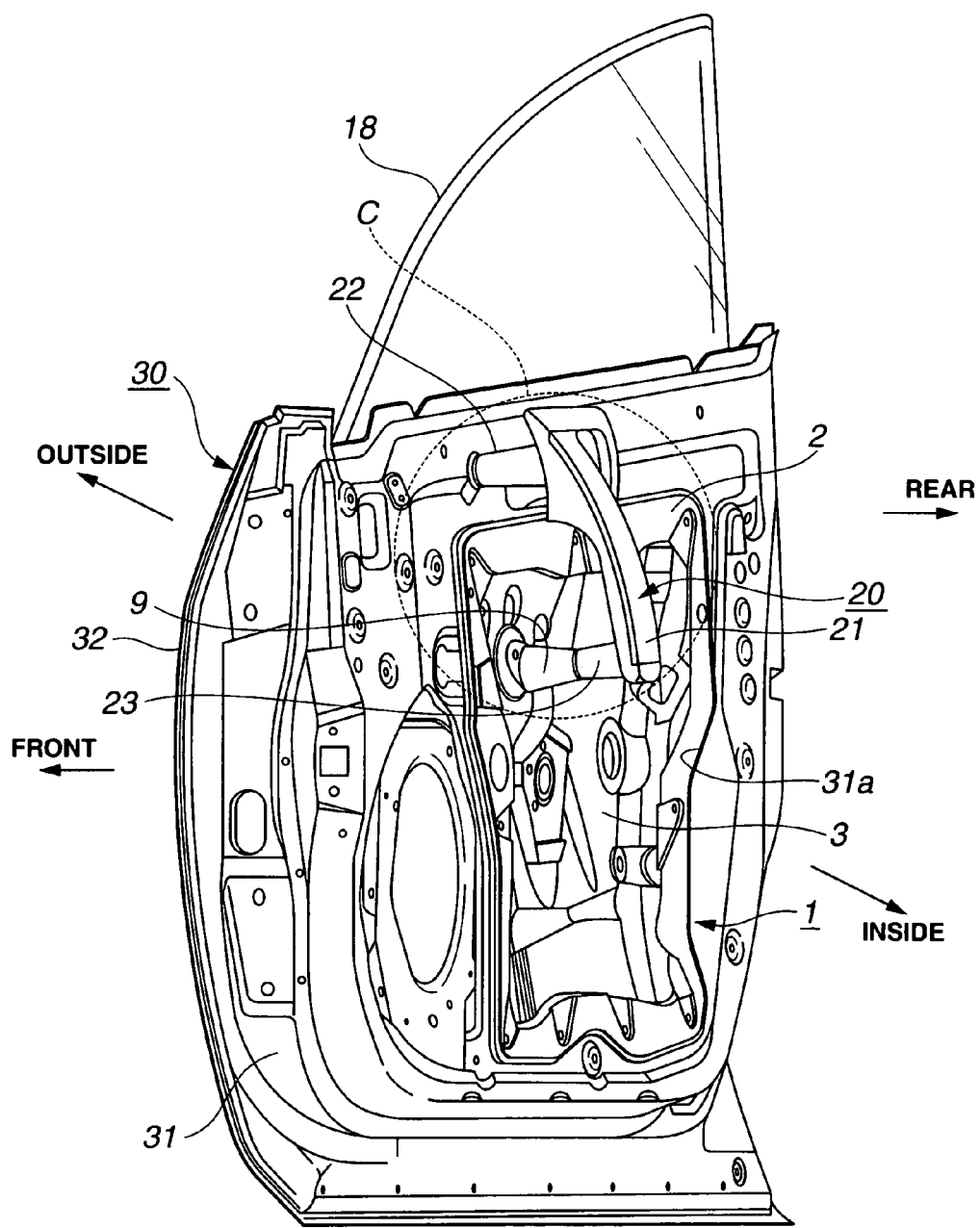
FIG. 8 is a partially broken perspective view of the automotive door of the invention, that is taken from a obliquely front position of the vehicle.

As will be understood from FIGS. 6 to 8, the module base 1 is constructed and arranged to be fixed to an inner metal panel 31 of the door in a manner to cover a rectangular handhole 31a formed in the inner metal panel 31. The handhole 31a is provided at a generally center portion of the inner metal panel 31.

As is seen from FIG. 1, the module base 1 is generally rectangular in shape, and comprises a generally rectangular flange portion 2 that is to be secured to a peripheral portion of the handhole 31a of the inner metal panel 31 (see FIG. 6), and a generally rectangular swelled portion 3 that is enclosed and held by the flange portion 2. As shown, the swelled portion 3 has a vertex at a generally center part thereof. Upon assembly in the door, the module base 1 is postured with the swelled portion 3 projected outward, that is, toward the outside of an associated vehicle. Actually, as is mentioned hereinabove and will be clarified hereinafter, the swelled portion 3 is formed with various portions that are not illustrated in FIG. 1. The flange portion 2 is formed with a plurality of bolt holes 4 that are used for securing the module base 1 to the inner metal panel 31, as will be described in detail hereinafter.

Figure 2:
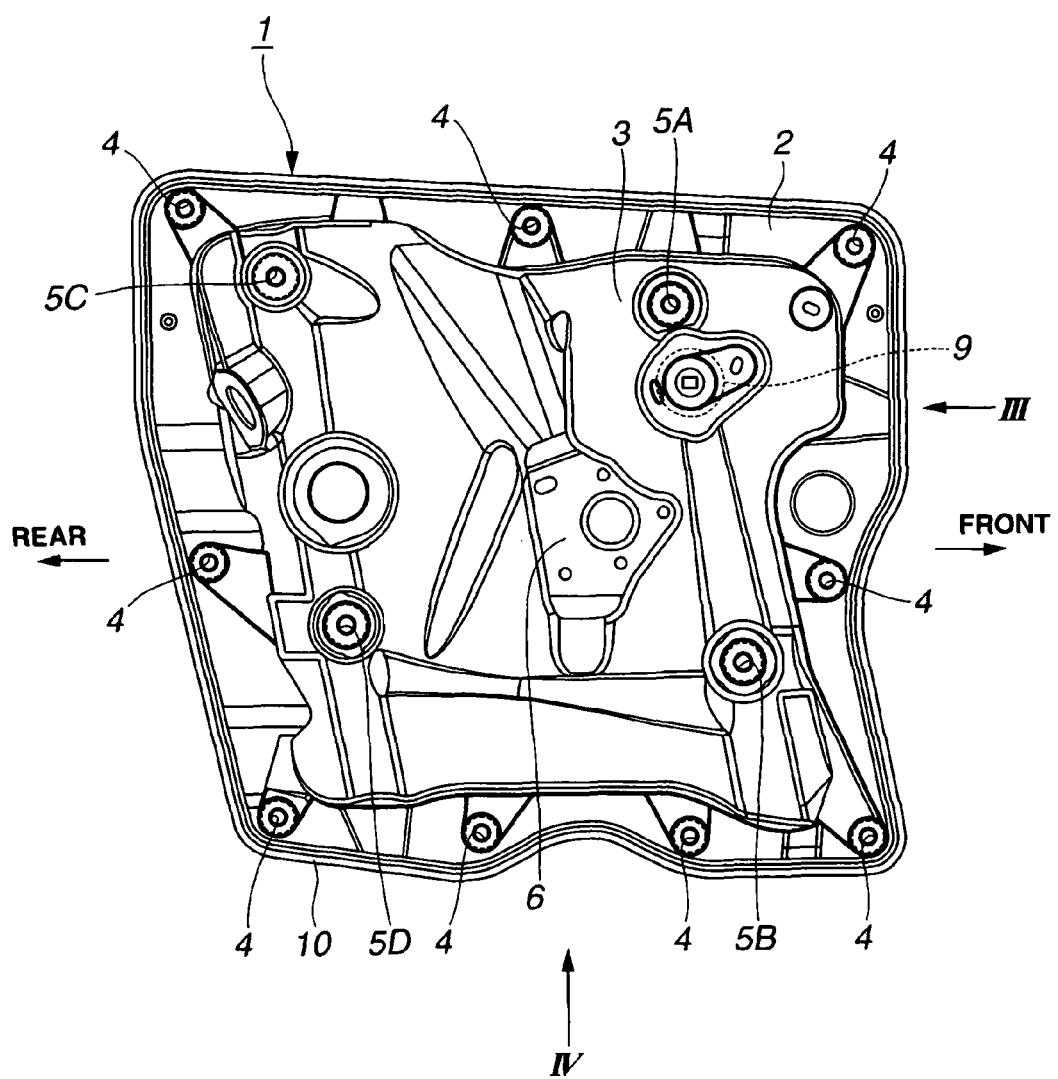
FIG. 2 is a plan view of the module base, that is taken from an outside of a vehicle.

As is seen from FIG. 2 that is a plan view of the module base 1, taken from an outside of the vehicle, the swelled portion 3 is formed with two front supporting projections 5A and 5B and two rear supporting projections 5C and 5D.

Figure 5:
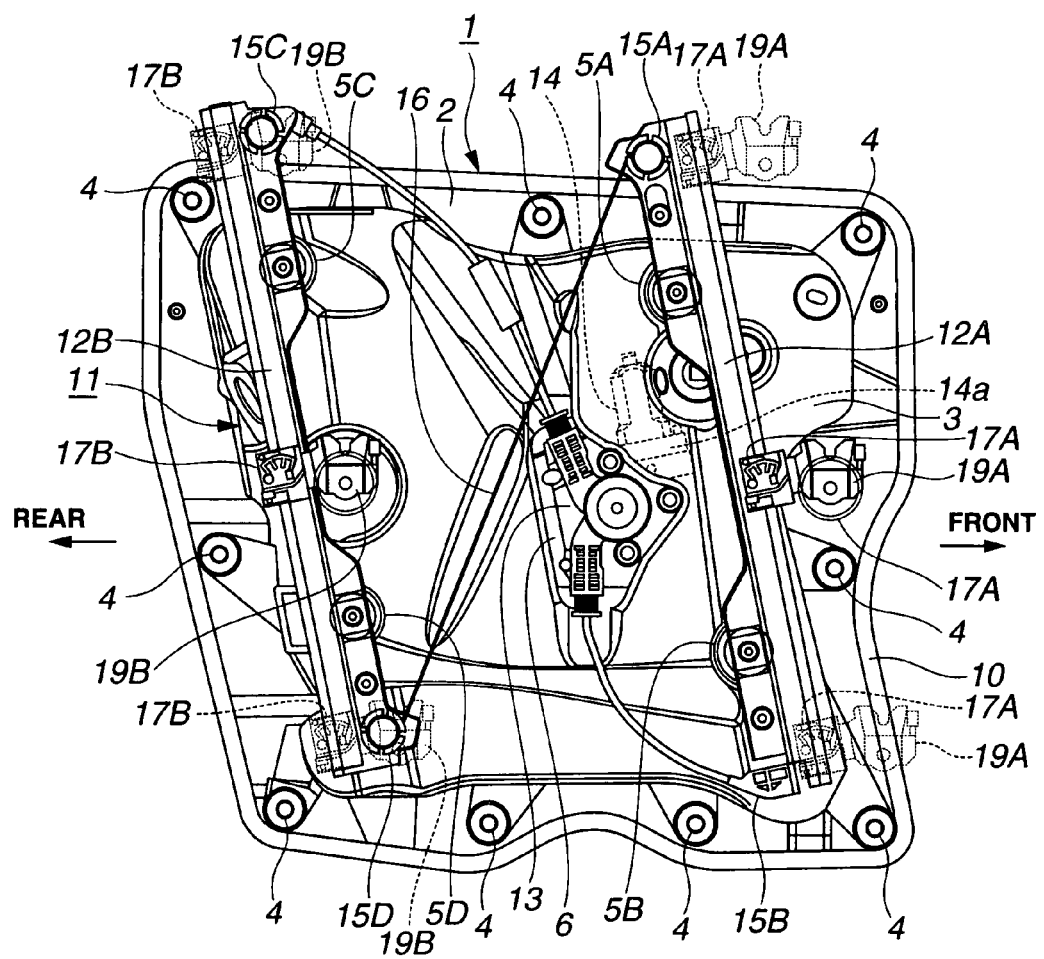
FIG. 5 is a view of the module base with a power window mechanism mounted thereon, that is taken from an outside of the vehicle.

As is seen from FIG. 5 that is a view of the module base 1 with a power window mechanism 11 mounted thereon, a front guide rail 12A is fixed to the front supporting projections 5A and 5B, and a rear guide rail 12B is fixed to the rear supporting projections 5C and 5D. These guide rails 12A and 12B are parts of the power window mechanism 11.

The swelled portion 3 is formed at a generally center area thereof with a generally triangular recess 6 for receiving therein a cable drive device 13 of the power window mechanism 11.

As is seen from FIGS. 2, 3 and 4, particularly FIG. 2, below the front supporting projection 5A, the swelled portion 3 is formed with a cup-shaped boss portion (or first boss portion) 9 that projects inward, that is, toward the inside of the vehicle.

As will be understood from FIG. 1 (and FIG. 2), the cup-shaped boss portion 9 is provided at an upper front part of the swelled portion 3.

As is seen from FIGS. 8 and 9 and will be described in detail hereinafter, the cup-shaped boss portion 9 is constructed to hold a part of an after-mentioned grip handle 20.

Referring back to FIG. 5, the rectangular flange portion 2 of the module base 1 is provided with a seal member 10 that is resiliently deformable. An adhesive material is used for bonding the seal member 10 to the flange portion 2.

That is, as is seen from FIG. 6, for connecting the module base 1 to the peripheral portion of the handhole 31a of the inner metal panel 31, the flange portion 2 of the module base 1 is pressed against an inside surface of the peripheral portion of the handhole 31a while compressing the seal member 10, and then the flange portion 2 is secured to the peripheral portion of the handhole 31a by means of a plurality of bolts as will be described hereinafter. With this, a satisfied sealing is obtained between the module base 1 and the inner metal panel 31. Upon this, the swelled portion 3 of the module base 1 is projected through the rectangular handhole 31a into a clearance defined between the inner and outer metal panels 31 and 32, placing the flange portion 2 of the module base 1 on the inside surface of the inner metal panel 31. Thus, the size of the rectangular handhole 31a is somewhat smaller than that of the module base 1.

As is best understood from FIG. 5, the power window mechanism 11 comprises the above-mentioned front and rear guide rails 12A and 12B fixed to the front and rear supporting projections 5A, 5B, 5C and 5D, the cable drive device 13 tightly installed in the triangular recess 6, an electric motor 14 that is fixed to a depressed inner surface of the module base 1, a speed reduction gear 14a that is connected to the electric motor 14 to provide the cable drive device 13 with a speed reduced rotation (or torque) from the motor 14, drive wires 16 that are put around guide rollers 15A, 15C and 15D and a guide member 15B that are provided at upper and lower ends of the front and rear guide rails 12A and 12B, front and rear sliders 17A and 17B that are slidably and respectively mounted on the front and rear guide rails 12A and 12B and connected to given portions of the drive wires 16, and front and rear glass pane holders 19A and 19B that are integral with the respective front and rear sliders 17A and 17B and support front and rear lower edges of a glass pane 18 (see FIG. 7).

As is seen from FIG. 5, the front and rear sliders 17A and 17B are moved together with their respective holders 19A and 19B between uppermost and lowermost positions which are illustrated by broken lines in the drawing. With such movement, the glass pane 18 held by the holders 19A and 19B is moved upward and downward while closing and opening a door window as is understood from FIG. 8.

As is seen from FIG. 6 that is a view taken from an inside of the vehicle with a door trim removed, a door 30 generally comprises the inner metal panel 31, an outer metal panel 32 of which outer periphery is welded to that of the inner metal panel 31 in a manner to define a certain clearance therebetween, and the module base 1 that is secured to peripheral portion of the rectangular handhole 31a of the inner metal panel 31. Thus, the swelled portion 3 of the module base 1 is postured to project into the certain clearance between the inner and outer metal panels 32 and 31.

A door trim (not shown) is placed on the inside surface of the inner metal panel 31, and thus, the unsightly parts and portions provided on the inside area of the inner metal panel 31 are all concealed by the door trim.

Although not shown in FIG. 6, the front end (viz., left end in the drawing) of the door 30 is pivotally connected to the vehicle body through hinges.

As will be understood from FIGS. 5 and 6, a plurality of connecting bolts 27 are used for securing the flange portion 2 of the module base 1 to the peripheral portion of the handhole 31a of the inner metal panel 31. That is, each connecting bolt 27 passing through the bolt hole 4 of the flange portion 2 is screwed into a corresponding threaded bolt opening formed in the peripheral portion of the handhole 31a. Thus, the handhole 31a is entirely covered by the module base 1.

Figure 3:
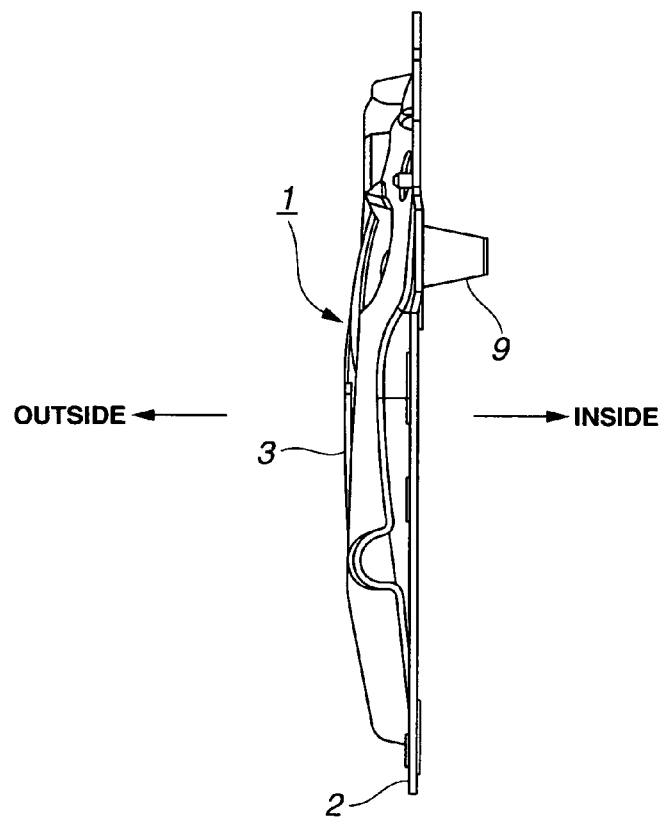
FIG. 3 is a view taken from the direction of an arrow "III" of FIG. 2.
Figure 4:
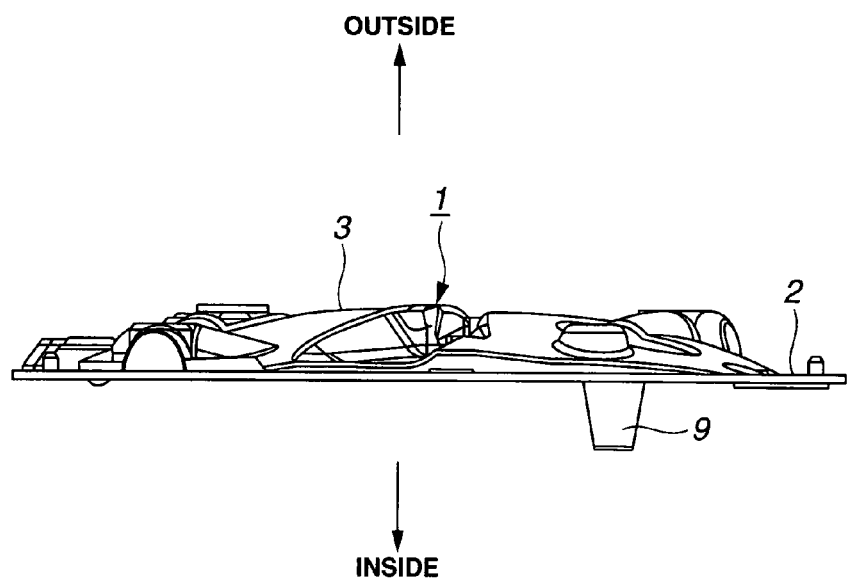
FIG. 4 is a view taken from the direction of an arrow "IV" of FIG. 2.

As will be understood from FIGS. 3 and 4, the cup-shaped boss portion 9 formed on the depressed inner surface of the swelled portion 3 of the module base 1 is largely projected toward the inside of the vehicle beyond the flange portion 2.

Referring to FIG. 8, there is shown a grip handle 20 that is incorporated with the door 30. As shown, the grip handle 20 is tightly secured to inside elements of the door 30, as will be described in detail in the following.

Figure 9:
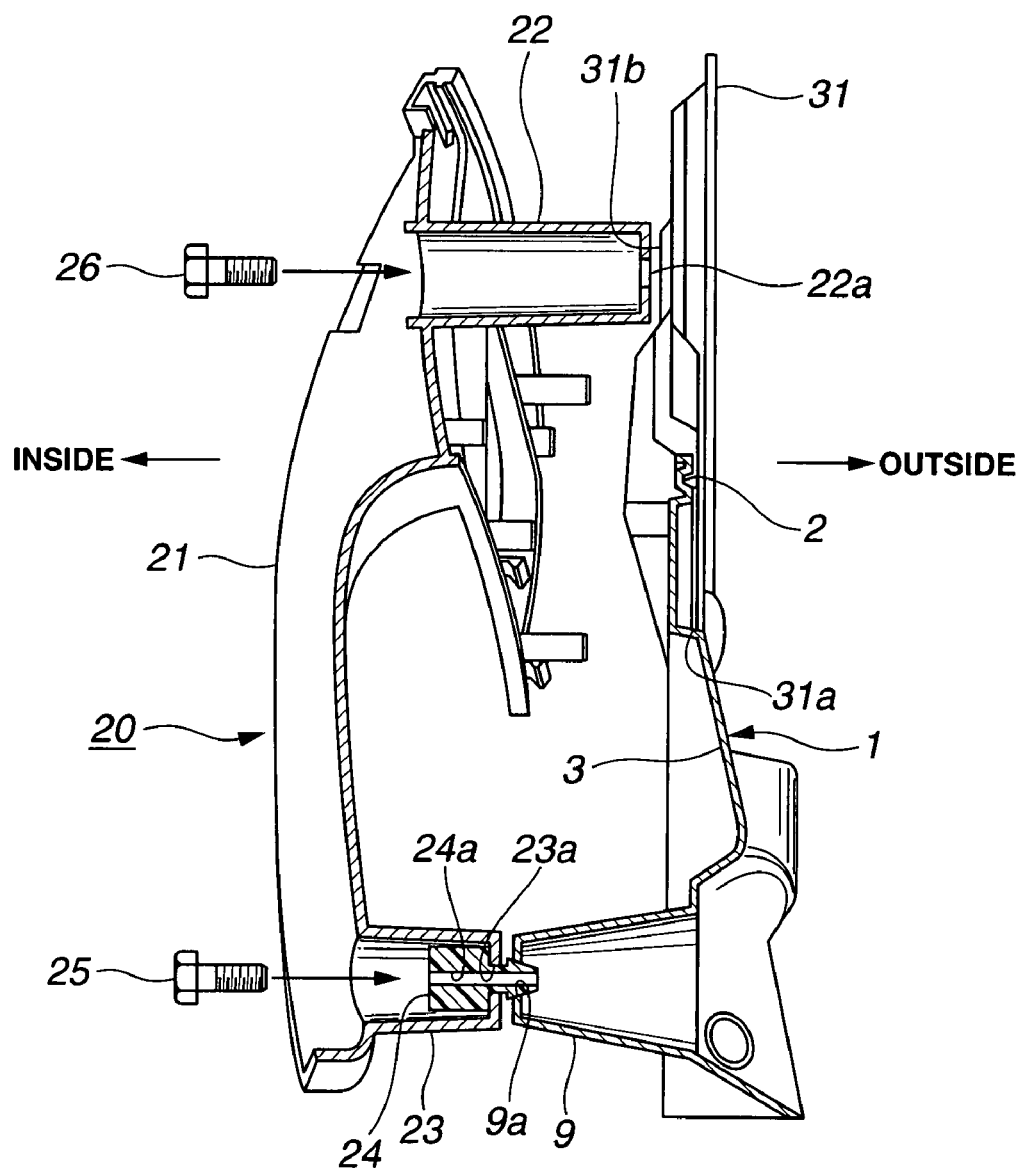
FIG. 9 is an enlarged sectional view of a grip handle that is about to be mounted to a handle mounting portion of the door base construction, the grip handle being shown in FIG. 8 in a circle indicated by the arrow "C".

As is seen from FIGS. 8 and 9, the grip handle 20 generally comprises a bridge portion 21 that is entirely exposed to the vehicle cabin, an upper hollow boss portion (or third boss portion) 22 that is projected from an upper end of the bridge portion 21 and a lower hollow boss portion (or second boss portion) 23 that is projected from a lower end of the bridge portion 21.

As is seen from FIG. 9, the upper hollow boss portion 22 is connected to a raised mount area 31b of the inner metal panel 31 by means of a connecting bolt 26. For this connection, a leading flat end of the upper hollow boss portion 22 is pressed against the raised mount area 31b and then the connecting bolt 26 passing through a bolt opening 22a formed in the flat end is screwed into a threaded bolt opening formed in the raised mount area 31b. Of course, a screw driver (not shown) is used for turning the connecting bolt 26.

As is seen from FIG. 9, the lower hollow boss portion 23 is connected to a flat top of the cup-shaped boss portion 9 of the module base 1. For this connection, a connecting bolt 25 and an angular elastic grommet 24 are used. That is, the flat top of the cup-shaped boss portion 9 and a flat top of the lower hollow boss portion 23 are formed with respective openings 9a and 23a. The angular elastic grommet 24 is formed with a smaller tapered head and has a bolt hole 24a formed therethrough. For the connection between the lower hollow boss portion 23 and the cup-shaped boss portion 9, the grommet 24 is deeply received in the boss portion 23 having the smaller tapered head projected to the outside through the opening 23a, and then the flat top end of the boss portion 23 is pressed against the flat top end of the cup-shaped boss portion 9 having the projected tapered head fully projected into the cup-shaped boss portion 9 through the opening 9a. Then, using a screw driver (not shown), the connecting bolt 25 is screwed into the bolt hole 24a deeply. With this, the smaller tapered head of the grommet 24 becomes enlarged in diameter and thus tightly engaged with the opening 9a of the cup-shaped boss portion 9.

Although not shown in FIG. 9, actually, a door trim is put between the inner metal panel 31 and the grip handle 20, so that only the bridge portion 21 of the grip handle 20 is exposed to the vehicle cabin.

As will be understood from the forgoing description and as is seen from FIGS. 3, 6 and 8, the swelled portion 3 of the module base 1 in the door 30 is swelled outward (viz., in an outside direction of the vehicle), the cup-shaped boss portion 9 is integral with and projected inward (viz., in an inside direction of the vehicle) from an upper front part of the swelled portion 3, and the lower boss portion 23 of the grip handle 20 is secured to the top of the cup-shaped boss portion 9.

When, now, the grip handle 20 (see FIG. 8) is gripped by an operator and pulled inward by him or her with a certain force for closing the door 30, a certain stress is applied to the module base 1 through the cup-shaped boss portion 9.

However, as will be understood from FIG. 1, since the cup-shaped boss portion 9 is projected inward from the back surface of the swelled portion 3, the stress applied through the cup-shaped boss portion 9 is evenly dispersed in and tightly held by the outwardly swelled portion 3 of the module base 1. Actually, the stress applied to the swelled portion 3 functions to compress the entire structure of the swelled portion 3 in a direction of the surface of the same, which increases a mechanical strength of the swelled portion 3. In other words, the entire construction of the swelled portion 3 serves to hold and bear the stress evenly. Furthermore, the stress applied to the entire construction of the swelled portion 3 is evenly transmitted to the inner metal panel 31 through the flange portion 2. Thus, even when the thickness of the module base 1 is not so large, the connection of the grip handle 20 to the door 30 is assuredly made.

In the foregoing description, the grip handle 20 is arranged vertically (see FIG. 8). Of course, the grip handle 20 may be arranged horizontally or obliquely.

If desired, the grip handle 20 may be connected to only the module base 1. In this case, the swelled portions 3 is formed with two boss portions to which the grip handle 20 is connected.

Furthermore, if desired, the module base 1 may be constructed of a metal plate.

Furthermore, if desired, in place of using the separate module base 1, the inner metal panel 31 per se may be formed with a swelled portion that is swelled outward.

The entire contents of Japanese Patent Application 2006-337763 filed Dec. 15, 2006 are incorporated herein by reference.

Although the invention has been described above with reference to the embodiment of the invention, the invention is not limited to such embodiment as described above. Various modifications and variations of such embodiment may be carried out by those skilled in the art, in light of the above description.

What is claimed is:

1. An automotive door comprising:
   an outer metal panel that faces outside of an associated motor vehicle when the door is closed;
   an inner metal panel that faces an interior of the associated motor vehicle when the door is closed, the inner metal panel being coupled with the outer metal panel to constitute a base construction of the door, the base construction having therein a clearance between the outer and inner metal panels;
   a module base incorporated with the inner metal panel, wherein the module base has a swelled portion that is projected into the clearance toward the outer metal panel, wherein the swelled portion has a curved surface forming a vertex at a generally center portion thereof such that the curved surface and the vertex project toward the outer metal panel, the curved surface curving away from the vertex in a first direction and in a second direction that is perpendicular to the first direction, wherein a first boss portion is integrally formed with a depressed back surface of the swelled portion such that the first boss portion and the swelled portion are formed as a single contiguous one-piece material, wherein the first boss portion projects toward the interior of the associated motor vehicle, and terminates in a flat top at a spaced distance from the depressed back surface; and
   a grip handle secured to the flat top of the first boss portion, wherein the grip handle is configured to be gripped and pulled by a passenger of the associated motor vehicle when the passenger wants to close the door.

2. An automotive door as claimed in claim 1, in which the module base is secured to the inner metal panel in a manner to cover a handhole formed in the inner metal panel.

3. An automotive door as claimed in claim 2, in which the swelled portion of the module base is exposed and projected into the clearance through the handhole of the inner metal panel.

4. An automotive door as claimed in claim 3, in which the module base is constructed of a plastic.

5. An automotive door as claimed in claim 4, in which the plastic is a glass fiber reinforced acrylonitrile butadiene styrene resin.

6. An automotive door as claimed in claim 1, in which the grip handle has a second boss portion that is secured to the flat top of the first boss portion of the swelled portion of the module base.

7. An automotive door as claimed in claim 6, in which the grip handle has a third boss portion that is secured to the inner metal panel.

8. An automotive door as claimed in claim 6, in which the second boss portion is secured to the first boss portion through an elastic grommet.

9. An automotive door as claimed in claim 1, further comprising:
    front and rear supporting projections integrally formed on the swelled portion of the module base;
    front and rear guide rails secured to the front and rear supporting projections, respectively;
    front and rear sliders slidably mounted on the front and rear guide rails, respectively, each slider having a holder portion;
    a glass pane held by the holder portions of the front and rear sliders; and
    a drive mechanism that moves the front and rear sliders between lowermost and uppermost positions.

10. An automotive door as claimed in claim 9, in which the drive mechanism comprises:
    an electric motor mounted on the depressed back surface of the swelled portion of the module base;
    a cable drive device installed in a recess formed on the swelled portion of the module base, the cable drive device being powered by the electric motor;
    guide members provided at upper and lower ends of the front and rear guide rails; and
    drive wires put around the guide members and driven by the cable drive device, the drive wires being connected to the front and rear sliders to move therewith.

11. An automotive door as claimed in claim 1, further comprising a handhole provided in the inner metal panel, the module base being secured to the inner metal panel in a manner to cover the handhole by the swelled portion, wherein the grip handle has a second boss portion secured to the flat top of the first boss portion and a third boss portion secured to a given part of the inner metal panel.

12. An automotive door as claimed in claim 11, in which the module base is constructed of a glass fiber reinforced plastic.

13. An automotive door as claimed in claim 11, further comprising a power window mechanism that is installed in the clearance and entirely held by the swelled portion of the module base.

14. An automotive door as claimed in claim 13, in which the power window mechanism comprises:
    front and rear guide rails that are secured to supporting portions formed on the swelled portion of the module base;
    front and rear sliders slidably mounted on the front and rear guide rails, respectively, each slider having a holder portion for holding a given portion of a window pane; and
    a drive mechanism that moves the front and rear sliders between lowermost and uppermost positions.

15. An automotive door as claimed in claim 14, in which the drive mechanism comprises:
    an electric motor mounted on the depressed back surface of the swelled portion of the module base;
    a cable drive device installed in a recess formed on the swelled portion of the module base, the cable drive device being powered by the electric motor;
    guide members provided at upper and lower ends of the front and rear guide rails; and
    drive wires put around the guide members and driven by the cable drive device, the drive wires being connected to the front and rear sliders to move therewith.

16. An automotive door as claimed in claim 1, in which the module base comprises a flange portion that is secured to an entire periphery of a hole in the inner metal panel, and wherein the swelled portion is enclosed and held by the flange portion.

17. An automotive door as claimed in claim 16, in which the first boss portion is cup-shaped and projects from the depressed back surface beyond the flange portion.

18. An automotive door as claimed in claim 16, in which the swelled portion is configured to evenly transmit applied stress from the first boss portion to the inner metal panel through the flange portion.

19. An automotive door as claimed in claim 1, in which the first boss portion is shaped as a truncated cone and is provided at an upper part of the swelled portion.

20. An automotive door as claimed in claim 1, in which a generally triangular recess is formed at the generally center portion of the swelled portion.

21. An automotive door as claimed in claim 1, in which the first boss portion is cup-shaped such that stress applied through the first boss portion is evenly dispersed in the swelled portion.

22. A motor vehicle, comprising:
    an interior cabin; and
    a door comprising:
        an outer metal panel that faces outside of the motor vehicle when the door is closed;
        an inner metal panel that faces the interior cabin when the door is closed, the inner metal panel being coupled with the outer metal panel to constitute a base construction of the door, the base construction having therein a clearance between the outer and inner metal panels;
        a module base incorporated with the inner metal panel, wherein the module base has a swelled portion that is projected into the clearance toward the outer metal panel, wherein the swelled portion has a curved surface forming a vertex at a generally center portion thereof such that the curved surface and the vertex project toward the outer metal panel, the curved surface curving away from the vertex in a first direction and in a second direction that is perpendicular to the first direction, wherein a first boss portion is integrally formed with a depressed back surface of the swelled portion such that the first boss portion and the swelled portion are formed as a single contiguous one-piece material, wherein the first boss portion projects toward the interior cabin, and terminates in a flat top at a spaced distance from the depressed back surface; and
        a grip handle secured to the flat top of the first boss portion,
    wherein the grip handle is configured to be gripped and pulled by a passenger when the passenger wants to close the door.

23. A motor vehicle as claimed in claim 22, in which the module base comprises a flange portion that is secured to an entire periphery of a hole in the inner metal panel, and wherein the swelled portion is enclosed and held by the flange portion.

24. A motor vehicle as claimed in claim 23, in which the first boss portion is cup-shaped and projects from the depressed back surface beyond the flange portion.

25. A motor vehicle as claimed in claim 22, in which the first boss portion is shaped as a truncated cone and is provided at an upper part of the swelled portion.

* * * * *